(12) United States Patent
Lobortas

(10) Patent No.: US 10,219,594 B2
(45) Date of Patent: Mar. 5, 2019

(54) METHOD OF STONE SETTINGS

(71) Applicant: Igor Lobortas, Kiev (UA)

(72) Inventor: Igor Lobortas, Kiev (UA)

(*) Notice: Subject to any disclaimer, the term of this patent is extended or adjusted under 35 U.S.C. 154(b) by 309 days.

(21) Appl. No.: 15/265,077

(22) Filed: Sep. 14, 2016

(65) Prior Publication Data

US 2017/0095046 A1    Apr. 6, 2017

Related U.S. Application Data

(63) Continuation of application No. 15/068,767, filed on Mar. 14, 2016.

(30) Foreign Application Priority Data

Oct. 5, 2015   (UA) .............................. 2015 09632 U

(51) Int. Cl.
   *A44C 17/04*   (2006.01)
   *B23P 5/00*    (2006.01)
   *A44C 27/00*   (2006.01)

(52) U.S. Cl.
   CPC ................ *A44C 17/04* (2013.01); *B23P 5/00* (2013.01); *A44C 27/00* (2013.01)

(58) Field of Classification Search
   CPC ............ A44C 17/04; A44C 27/00; B23P 5/00
   See application file for complete search history.

(56) References Cited

U.S. PATENT DOCUMENTS 5,377,506 A * 1/1995 Tranzer ................. A44C 17/04
                                                    63/28

* cited by examiner

*Primary Examiner* — David P Bryant
*Assistant Examiner* — Christine Pellazar Bersabal
(74) *Attorney, Agent, or Firm* — Nadya Reingand; Yan Hankin

(57) ABSTRACT

The invention offers a solution in jewelry manufacturing and production industry. In details, the invention implies mounting stones on a metal base, including pieces of jewelry or bijouterie with stones or gems. According to the described method, each stone pavilion is placed in an appropriate seat, in which the inserted stones are held at least by protruding projections or beads made on the edge of the seats. The invention solves the issue of the densest placement of stones, which are mainly round in view from above or have a round gem-cutting on the surface of the base of a jewelry piece.

9 Claims, 11 Drawing Sheets

A-A

METHOD OF STONE SETTINGS

CROSS-REFERENCE TO RELATED APPLICATIONS

The present application is a Continuation of U.S. application Ser. No. 15/068,676 filed Mar. 14, 2016, which claims priority to Ukrainian patent application u 2015 09632 filed on Oct. 5, 2015 which got positive decision on Jan. 13, 2016.

FIELD OF THE INVENTION

The invention belongs to solutions in jewelry, or bijouterie, or souvenir production. In particular, the invention refers to mounting stones on a metal base, including pieces of jewelry or bijouterie with stones or gems. The method can be mainly applied to mounting stones or gems of different sizes on a metal base.

BACKGROUND OF THE INVENTION

As for the technical background, U.S. patent application (U.S. Pat. No. 5,848,539 (A) published on Dec. 15, 1998) is known, which describes a piece of jewelry with a set of medium-sized stones, where each stone has at least one cutout groove. The base has two interior sidewalls and two opposite exterior sidewalls formed directly by the base which extend from the base to form seats in which a sidewall has an inward-facing protruding projection. The product has at least two zigzag sidewalls that separate the seats and form three rows, and the zigzag sidewalls have the inward-facing protruding projections placed into the row, which are inserted into the carved out stone groove after the stone is mounted in a seat.

A weak point of such known technical solution after the U.S. Pat. No. 5,848,539 (A) is the complexity of its implementation, which does not affect the setting strength of the final product. Availability of the zigzag grooves does not allow the solution to be applied in a number of product designs having seats because a product base should have a flat surface only. In addition, stones can only be placed on the surface of a piece of jewelry, and the part of a jewelry with the stones must be limited with a sidewall formed by the base. The presence of carved out grooves in stones complicates the process of preparing stones for their mounting on the surface of a jewelry.

One more U.S. patent application is known (U.S. Pat. No. 5,377,506 (A), published on Jan. 3, 1995), which describes a method of mounting stones in a piece of jewelry made of a metal or a metal alloy, for stones used in a jewelry decoration and mounted on the surface of the base in seats. The set of stones of a larger and smaller diameter that are round in view from above or have a round gem-cutting, elongated down pavilion and a small radius of curvature of the girdle peripheral edge, is placed on the surface of the base of a piece of jewelry. Each precious stone pavilion is inserted into an appropriate seat. The inserted stones are held in seats at least by means of ledges or beads that are formed on the edge of the seats.

A disadvantage of such solution after the U.S. Pat. No. 5,377,506 is insufficient reliability of mounting stones of a smaller diameter.

It is caused by the fact that the protruding projections or beads are formed by drilling through holes of the same diameter for stones with a larger and smaller diameter, which are then expanded from outside by means of a larger diameter drill. On the edges of seats the protruding projections or beads are formed, and the stones of a larger diameter are fixed in the seats by means of beads, and the stones of a smaller diameter are held in their seats only due to pressing a pavilion of each larger diameter stone of the crown to at least one smaller diameter stone at least partially to the edge and/or sidewalls seats. Lack of protruding projections or beads for mounting stones of a smaller diameter in seats results in their falling out of seats if a neighboring stone of a larger diameter is fallen out.

Besides, stones with a larger diameter are separated by protruding projections or beads, which reduces the base area of a piece of jewelry, filled with stones.

After refinement, projections or beads have a pointed shape, which causes clutching of jewelry with clothes and a further displacement of projections or beads. Change in projection or bead position results in decreased reliability of mounting stones and leads to their loss. In addition, loss or damage of at least one projection or bead leads to the loss of the stone.

Based on the above background, it was found that the problem of achieving high reliability in mounting stones on a jewelry base and providing a high percentage of filling the surface of the base with the precious stones has not been solved.

SUMMARY OF THE INVENTION

The invention solves the problem of the densest placement of stones, which are mainly round in view from above or have a round gem-cutting, on the surface of the base of a jewelry or bijouterie piece.

In addition, the invention allows to use the proposed method of mounting stones on the base with any form of curvature.

The problem is solved by the fact that the method of mounting stones for a piece of jewelry or bijouterie made of a metal or a metal alloy, for stones used for a decoration of a jewelry or a bijouterie and mounted on the surface of the base in the seats, in which a set of stones of the larger and smaller diameters having a round form in view from above or a round gem-cutting, crown, girdle and pavilion, is placed on the surface of the jewel piece or bijouterie base.

In this way each stone pavilion is placed in an appropriate seat, and the inserted stone is held at least by protruding projections or beads that are formed on the edge of the seats.

According to the described method, the area of the base, its thickness and its shape where the base has at least one outer edge is previously determined based on the type, size, weight of the stones or purpose and/or type of the piece of jewelry or bijouterie.

Further according to the method, the points which correspond to the centers of through holes are marked, and these marked points form the direct, or radial, or arcuate rows of seats.

The seats for the smaller and larger diameter stones are formed, where the seats for stones are formed by drilling through holes with a smaller diameter drill and then the entrance of each hole is expanded from the side of the base by a larger diameter drill to form a funneled-shape seat for the stone. And so formed smaller diameter holes of seats for the smaller diameter stones are smaller in size than the formed smaller diameter holes of seats for the larger diameter stones.

The grooves an the surface of the base are carved out by a burin or by another method or tool. Moreover, the grooves pass across the center of the seats. Moreover, the grooves are cut lengthwise, crosswise and diagonally under a preset angle against the formed rows of seats. The preset angle is determined based on the shape and/or curvature of the base surface; moreover, an excessive metal is removed by carving out grooves in the base surface. In addition, the grooves that pass along the rows of seats for the smaller diameter stones have a larger socket to form a multilevel arrangement of stones of different diameters.

Protruding projections or beads on the surface of the base are shaped, where protruding projections or beads are formed on the edge of the seats, by expanding the funneled-shape entrance of seats with a larger diameter drill both for the smaller diameter stones and the larger diameter stones, and making the grooves. So formed protruding projection or bead in cross section makes a rectangle, at least one side of which is formed by a burin or by another method or tool when cutting out grooves and at least two sides are formed when expending the funneled-shape seats by a large diameter drill both for the smaller and the larger diameters stones. And the protruding projections or beads used for fixing the larger diameter stones are larger in size than the protruding projections or beads used for fixing the smaller diameter stones.

Protruding projections or beads are sharpened for mounting the larger diameter stones by making the angular cuts at least on two sides formed when expanding the entrance of funnel-shape seats with a larger diameter drill for the larger diameter stones towards the middle of the bead, where the angular cut on protruding, projection or bead is made to cover the girdle of the larger diameter stone.

The smaller diameter stones are placed one by one into the seats in the respective rows and are clamped by protruding projections or beads; then the larger diameter stones are placed in the respective rows and clamped by protruding projections or beads. And the stones are mounted into the seats, which are located by straight, or radial, or arcuate rows, where the rows of seats for the larger diameter stones interchange with the rows of seats for the smaller diameter stones, and the stones of the larger and the smaller diameter form a multilevel structure of stones arrangement. And the smaller diameter stones are placed at the lower level, while the larger diameter stones are placed at the top level, so that the girdle of the smaller diameter stones is below the girdle of the larger diameter stones as to the surface of the base. And the larger diameter stones are placed in such a manner so that the girdles of the neighboring larger diameter stones would have a contact point. And the larger diameter stones are placed to ensure at least partial overlapping with the smaller diameter stones so that the pavilion of each larger diameter stone would partially overlap the edge of the crown of at least one smaller diameter stone. Moreover, there is no contact point between the stones of a larger and smaller diameter.

The stones are mounted by processing protruding, projections or beads to obtain a predetermined shape, where the processing involves the simultaneous pressing and rotation of the ball burr on the protruding projections or beads. And each larger diameter stone is fixed either by two processed protruding projections or beads located on the opposite sides of the same groove with at least two points of the seat edge if the larger diameter stone is located in the last row or in the row adjacent to the last row of the smaller diameter stones, or by two pairs of the processed protruding projections or beads located on the opposite sides of the same groove in case the larger diameter stone separates from the edge of base at least one row of the larger diameter stones.

Each smaller diameter stone is fixed either by a processed protruding projection or by a bead from one side at least at one point from the other side in case the smaller diameter stone is located in the last row or by two processed protruding projections or beads placed at the edges of two adjacent non-overlapping grooves.

A predetermined form of each protruding projection or bead processed by a ball burr has a spherical end.

At least one size of the spherical end of the protruding projection or bead, by which the larger diameter stone is fixed, is bigger than the same size of the spherical end of protruding projections or beads, by which the smaller diameter stone is fixed.

According to the claimed method, the outer edge of the base with the fixed stones is cut off at the level of the girdle of the stones with same diameter, while an uncovered metal triangular shape area is formed on the outer edge of the base.

According to the claimed method, the outer edge of the base with the fixed stones is cut around the circumference that repeats the circle of the stone girdles of the same diameter of the outer edge, at a predetermined distance from the stone girdles of the same diameter of the outer edge, with a uncovered metal V-shaped area formed on the edge of the base.

According to the claimed method, the outer edge of the base with fixed stones is cut around the circumference of girdles of the same diameter stones of the outer edge.

BRIEF DESCRIPTION OF THE DRAWINGS

Summary of the invention and confirmation of the possibility of its implementation will be clear to a skilled specialist in this area from the following description, which is supported by the pictures, in which.

Figure 1A:
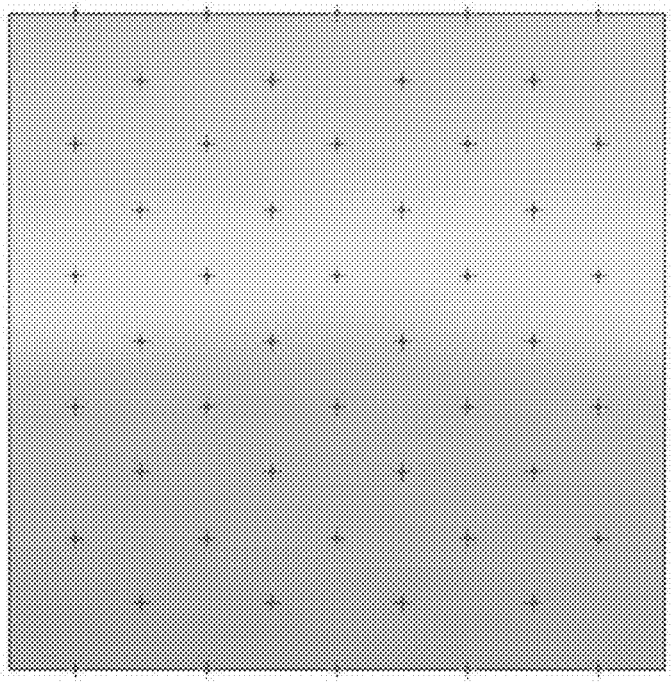
FIG. 1A shows the top view of the surface of a jewelry or a bijouterie base, marked with dots that correspond to the centers of through holes.

As the invention can be modified and may have some alternative designs, the following drawings are given as the examples to describe the invention and clarify the possibility of its implementation and will be described in details. It should be obvious that the enclosed pictures and the detailed description are not intended to limit the invention by the given design samples, but the invention shall include all possible modifications, equivalents and alternatives secured by the summary and the scope of the patent protection, which is set forth in the claims of the invention.

SPECIFIC DESCRIPTION OF PREFERRED EMBODIMENTS

Below is the description of some possible embodiments and a special terminology will be used herein for their description. However, it is clear that there are no restrictions as to the scope of this invention. Changes and some additional modifications of some specific features of the invention described herein, as well as some additional applications of the principles of this invention described herein, which will be performed by a skilled specialist in the relevant technical field to which the described method belongs to, should be considered as those included in the scope of this invention. In addition, it should be understood that this invention is not restricted by a specific embodiment and materials described herein, because they may vary to some extent. It should also be understood that the document terminology is used only to describe some certain embodiments and is not intended to limit the scope of the legal protection. Usage of equivalent terms that will later be used by the third parties to describe this invention must be considered as the use of features of this method.

This invention refers to the method of stone mounting preferably in a piece of jewelry or bijouterie. However, application of this method for decorating weapons, stationery, decorative items and the like with stones will be clear for a skilled specialist. Precious, semiprecious and decorative stones, glass and its derived forms, artificial materials of transparent or semi-transparent structure can be used as the atones. The claimed method has the biggest advantages when the precious or semi-precious stones are used, due to the tricks of light in such materials. The stones have a round form in top view or have a round gem-cutting, crown, girdle and pavilion. Of course, the stones may have another form defined in an imaginary section of the girdle: square, rhomb-shaped, square-shaped, oval, triangular or polygonal. In this case the order of the seats for the stones changes, but the key point of the claimed method remains unchanged.

Preferably, the claimed method deals with the stones of two diameters. The diameter stands for the numeric value of the diameter size of the stone on its girdle if the stone has a circular shape in its top view or a round gem-cutting. For stones of other shapes a different definition of diameter can be applied, which implies the stone size between two points on its girdle.

According to the method, based on the type, size, weight of stones or purpose and/or type of a piece of jewelry or bijouterie, a base of the required size, thickness and shape is chosen, where the base has at least one outer edge. The base can be made of a precious or non-precious metal or a metal alloy, or the other material, which is suitable for machine processing. Preferably, the size of the stones is determined based on the fact that the diameter of a smaller diameter stone is bigger than or equal to the half of the diameter of a larger diameter stone.

The base can have different shapes: rectangular, curved, closed, spheroidal or other shapes. Keep in mind that the shape is taken according to the purpose or the type of the final design. Based on those, material and the shape of the base is chosen. The criteria for selecting the material for the base are the weight, cost, malleability, strength and accessibility of the material. Shape of base is selected based on the properties of the material or the artistic solution, purpose and characteristics of the final product. The edge of base stands for the place of base adjacent to the first or the last row of stones. The term "at least one edge of the base" implies availability of different forms of base embodiment: depending on its type and shape, a base can have one, two or more edges. For example, for a pendant can be chosen with a base of a spheroidal form having one edge with the attached needle or a fastening mechanism or a clasp etc. For the base that has more edges, a shape in the form of a triangle or a polygon or a shape with at least one direct line and/or one curve line combined (for example, a semicircle shape) is taken. A skilled specialist may choose a product shape based on the product type and its final purpose, whereas the essence of the claimed method of stone settings will remain the same.

Figure 1B:
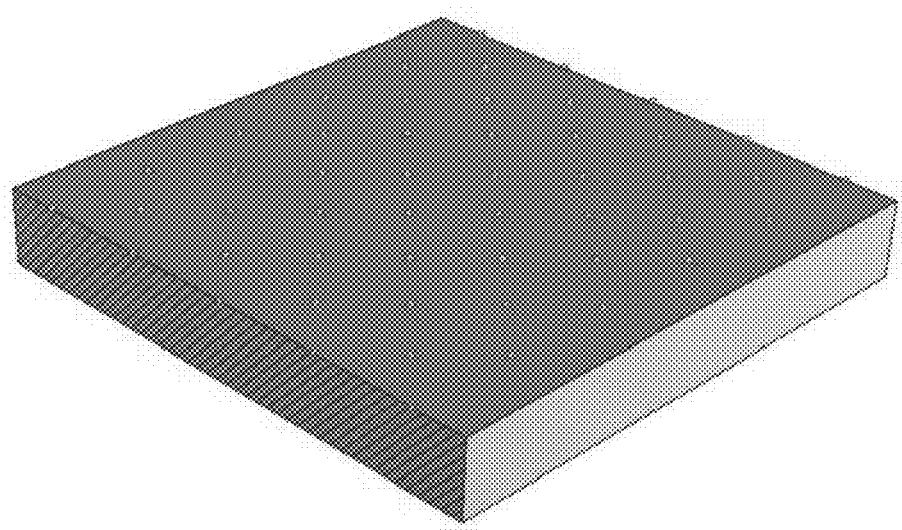
FIG. 1B shows the axonometric view of the surface of the jewelry or bijouterie base, marked with dots that correspond to the centers of through holes.

FIG. 1a and FIG. 1b show the surface of the base of a jewelry or a bijouterie, marked with dots that correspond to the centers of the through holes. The markup points are plotted by making labels on the surface of the base. The markup points match with the centers of the through holes making direct, or radial, or arcuate rows of seats. The radius of curvature of the radial or curved rows is chosen based on the size of the base and technical characteristics of tools that will be used in further base processing.

Figure 2A:
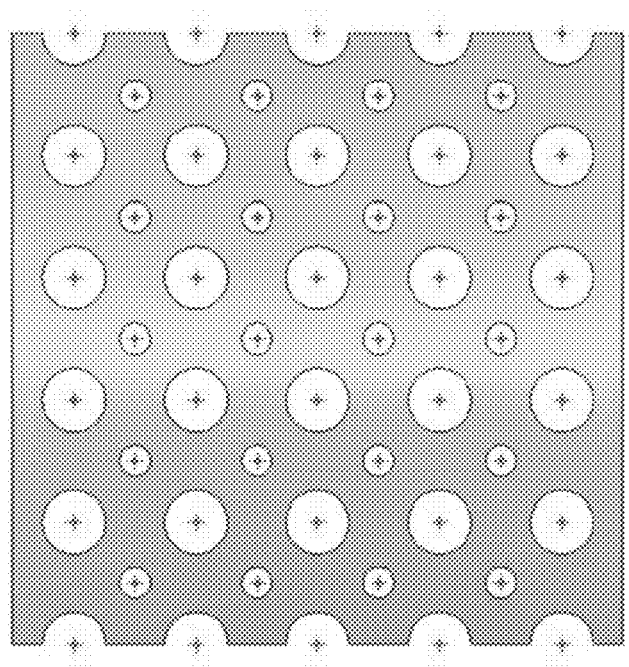
FIG. 2A shows the top view of the surface of the jewelry or bijouterie base with holes for seats of the smaller and larger diameter stones.
Figure 2B:
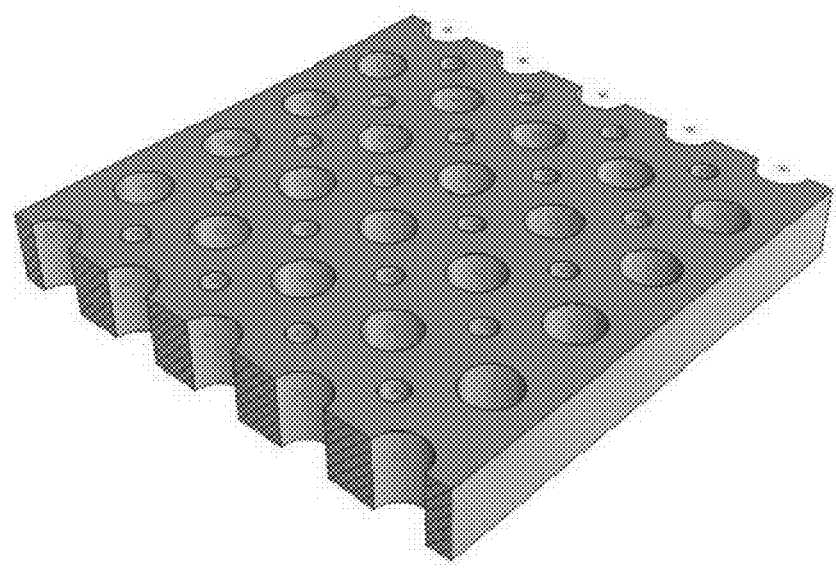
FIG. 2B shows the axonometric view of the surface of the base with holes for seats of the smaller and larger diameter stones.

FIGS. 2a and 2b show the surface of the base with the holes for the seats of the smaller and larger diameter stones. The seats for the stones are made by drilling through holes with a smaller diameter drill and then expanding these holes from the base side with a larger diameter drill to make a funneled-shape seat for the stone.

Figure 3A:
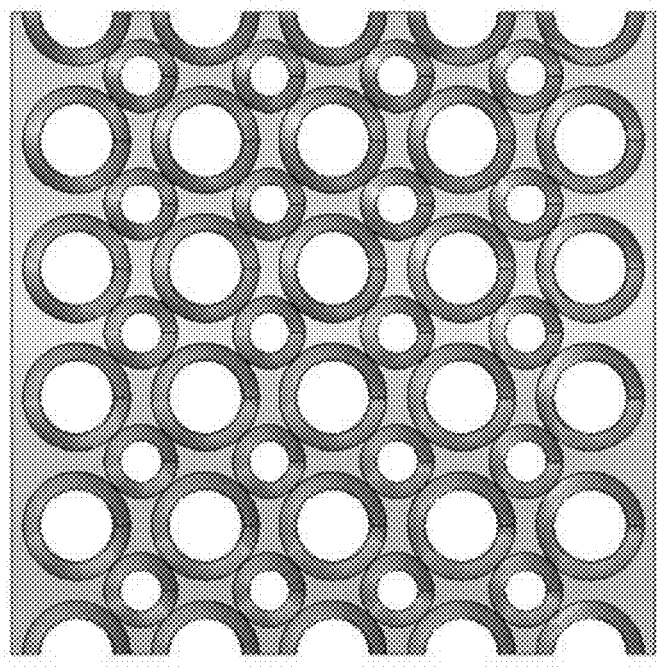
FIG. 3A shows the top view of the surface of the base with funnel-shape seats for stones.
Figure 3B:
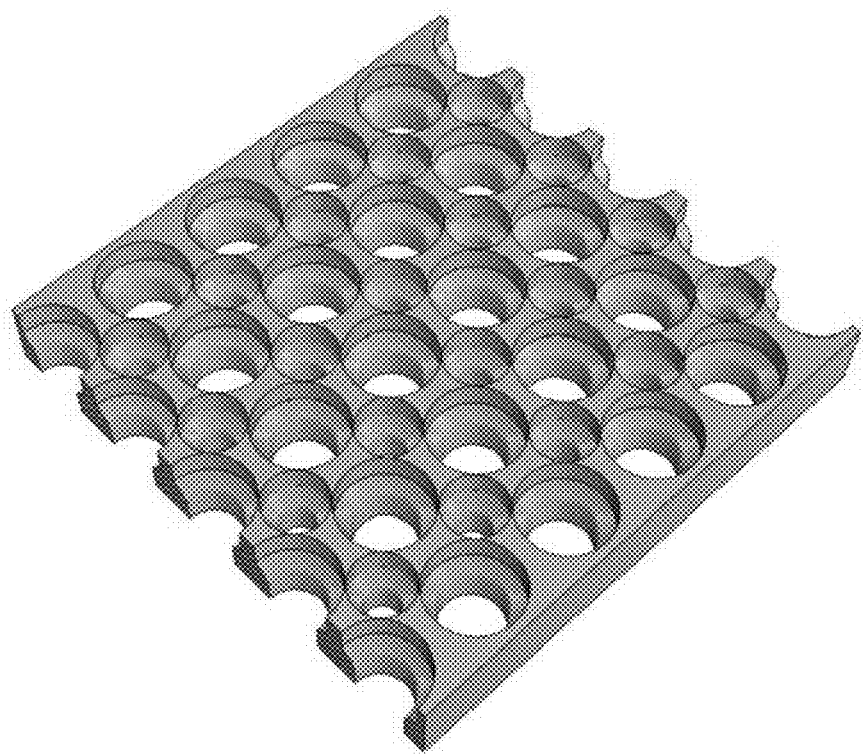
FIG. 3B shows the axonometric view of the surface of the base with funnel-shape seats for stones.

FIGS. 3a and 3b show the surface of the base with the formed seats of the funneled shape for the stones. The formed holes of the smaller diameter seats for the smaller diameter stones are smaller in size than the holes of the smaller diameter seats for the larger diameter stones. This is achieved by using a smaller diameter drill and a large diameter drill to obtain seats for the larger diameter stones and by using a smaller diameter drill and a larger diameter drill to obtain seats for the smaller diameter stones. FIGS. 2a and 2b, 3a and 3b clearly show the ratio between the diameters of these holes, but this ratio does not restrict embodiment of the claimed method only by this particular design.

Figure 4A:
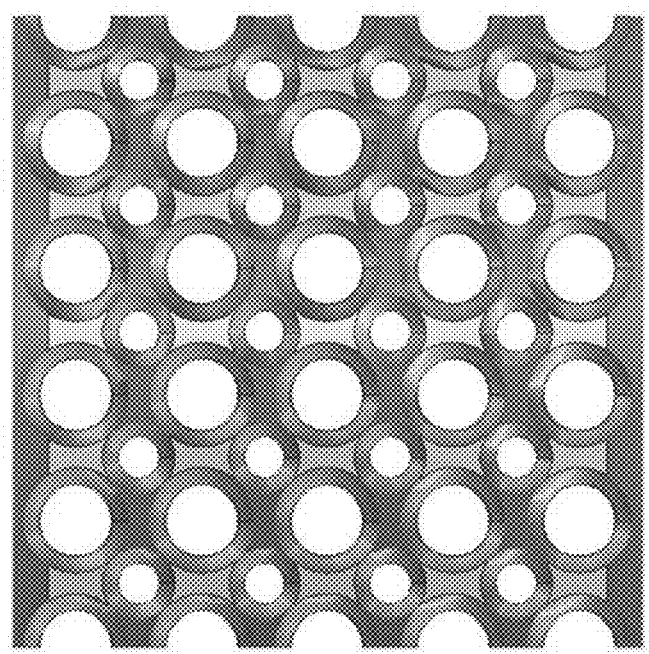
FIG. 4A shows the top view of the surface of the base with the grooves passing along the rows of seats for the smaller diameter stones.
Figure 4B:
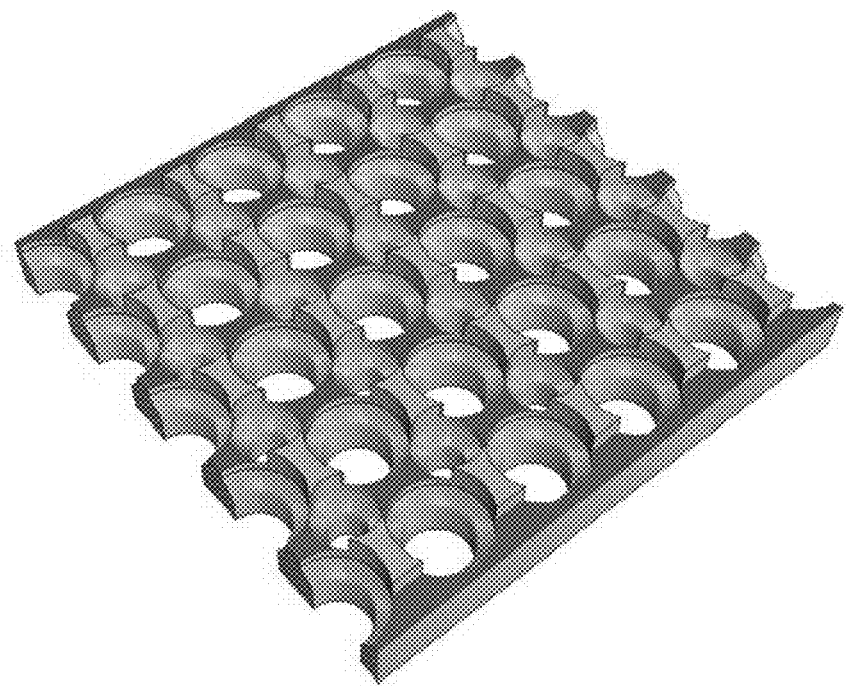
FIG. 4B shows the axonometric view of the surface of the base with grooves passing along the rows of seats for the smaller diameter stones.

FIG. 4a and FIG. 4b show the base surface with the formed grooves passing along the rows of seats for the smaller diameter stones. The grooves on the surface of the base are cut by a burin or by another method or tool by embedding its edge into the base. The grooves predominantly have a flat bottom and pass through the center of the seats. In addition, the grooves that pass along the rows of seats for the smaller diameter stones are deeper to provide a multilevel arrangement of stones of different diameters. This can increase a percentage of stones covering the surface of the product, as the smaller diameter stones will be partially overlapped by the larger diameter stones, as shown below.

Figure 5A:
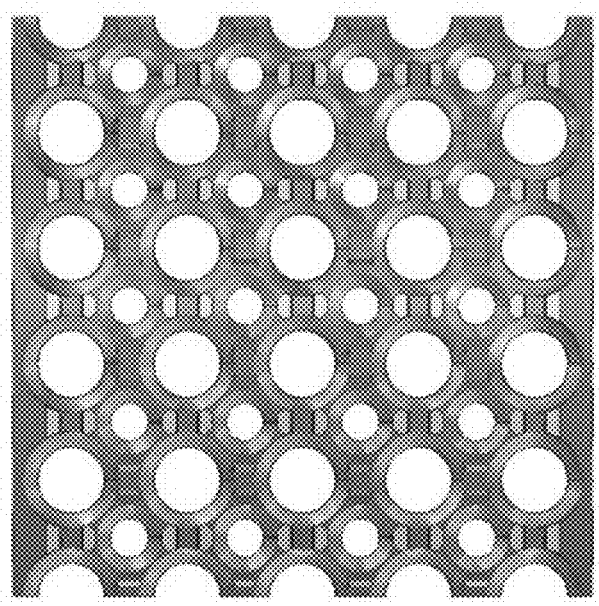
FIG. 5A shows the top view of the surface of the base formed with grooves cut lengthwise, crosswise and diagonally under a preset angle as to the formed rows of seats.
Figure 5B:
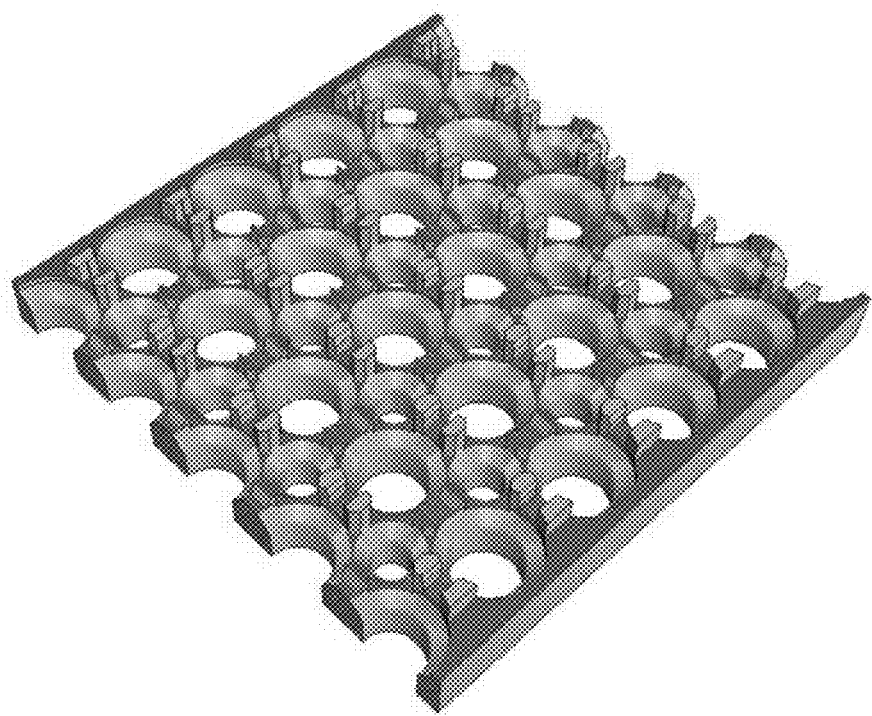
FIG. 5B shows the axonometric view of the surface of the base formed with grooves cut lengthwise, crosswise and diagonally under a preset angle as to the formed rows of seats.

FIG. 5a and FIG. 5b show the base surface with the formed grooves cut lengthwise, crosswise and diagonally under a preset angle as to the formed rows of seats. The grooves predominantly have a flat bottom and pass through the center of seats. Moreover, the grooves are cut lengthwise, crosswise and diagonally under a preset angle as to the formed rows of seats. The specified angle is determined by the radius of curvature of the radial or curved rows of seats. In addition, the specified angle is determined based on the shape and/or the curvature of the base. At this step, the excessive metal is removed from the surface of the base by means of carving out grooves with a burin or by another method or tool. This allows to reduce the weight of the base, which is important for such products as earrings.

Figure 6A:
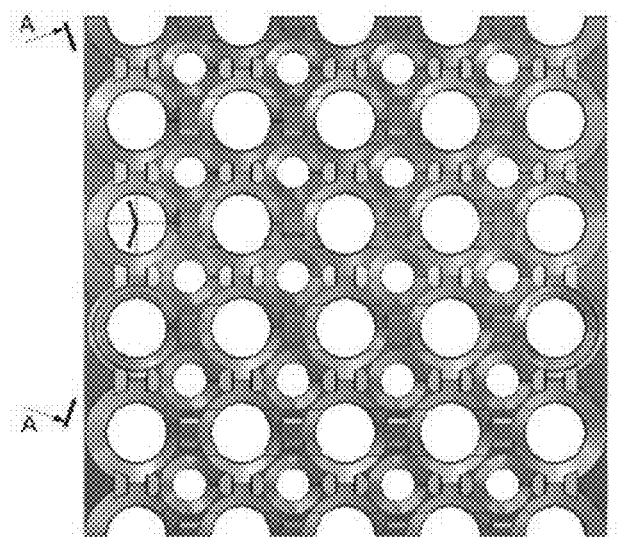
FIG. 6A shows the top view of the surface of the base with protruding projections or beads formed on the surface of the base.
Figure 6B:
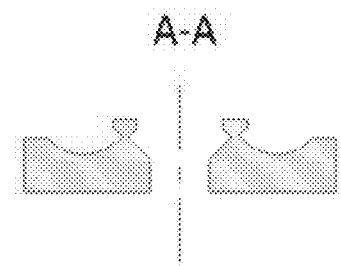
FIG. 6B shows the cross section of the base through protruding projections or beads.
Figure 6C:
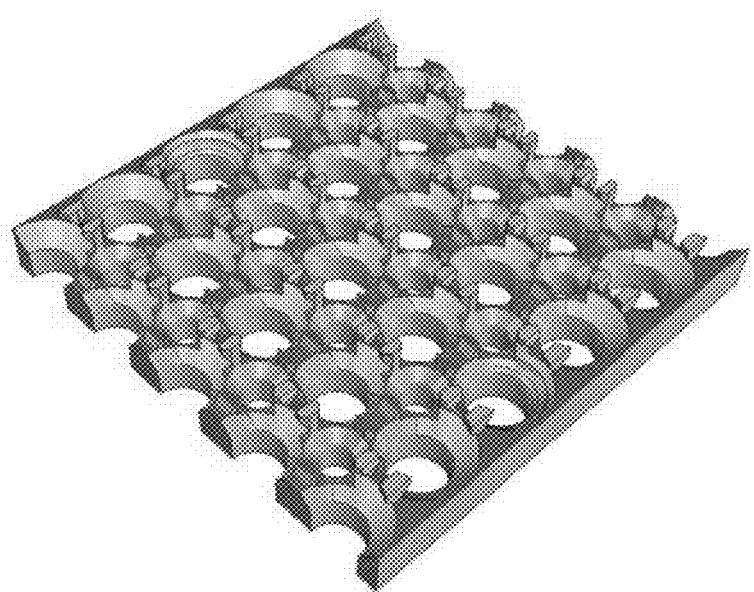
FIG. 6C shows the axonometric view of the surface of the base with protruding projections or beads formed on the surface of the base.

FIG. 6a and FIG. 6c show the base surface with the protruding projections or beads formed on the surface of the base. The protruding projections or beads are formed on the edge of the seats by expanding the funneled-shape seat entrances with a the larger diameter drills both for the smaller diameters stones and the larger diameter stones, and by making the grooves.

The protruding projection or bead has a four-cornered shape in its cross section with at least one side formed by a burin or by another method or tool when carving out the grooves and at least two sides formed when expanding the funneled-shape seats by the larger diameter drills both for the smaller diameters stones and the larger diameter stones. The dimensions of the protruding projections or beads depend on the selected diameter of a larger diameter drill.

And the protruding projections or beads used for fixing or clamping the larger diameter stones are larger in size than the size of the protruding projections or beads used for fixing the smaller diameter stones. The size can be adjusted by a burin to correct deviations, since these protruding projections or beads must be made of the same size mainly for the stones of the same diameter.

The protruding projections or beads made as described above, can increase the percentage of coverage of the base with the stones, since these protruding projections or beads ensure a tight allocation of the larger diameter stones on the base.

FIG. 6b shows a cross section of a base that matches the vertical axis of a protruding projection or a bead. The protruding projections or beads are sharpened for fixing the larger diameter stones by making the angular cuts at least on two sides formed while expanding the entrance of the funnel-shape seats with a larger diameter drill for the larger diameter stones towards the middle of the bead, where the angular cut on the protruding projection or bead is formed in order to cover the girdle of the larger diameter. This can increase the mounting strength, since the protruding projections or beads clench the girdle of stone by the formed groove without additional mechanical processing.

Figure 7A:
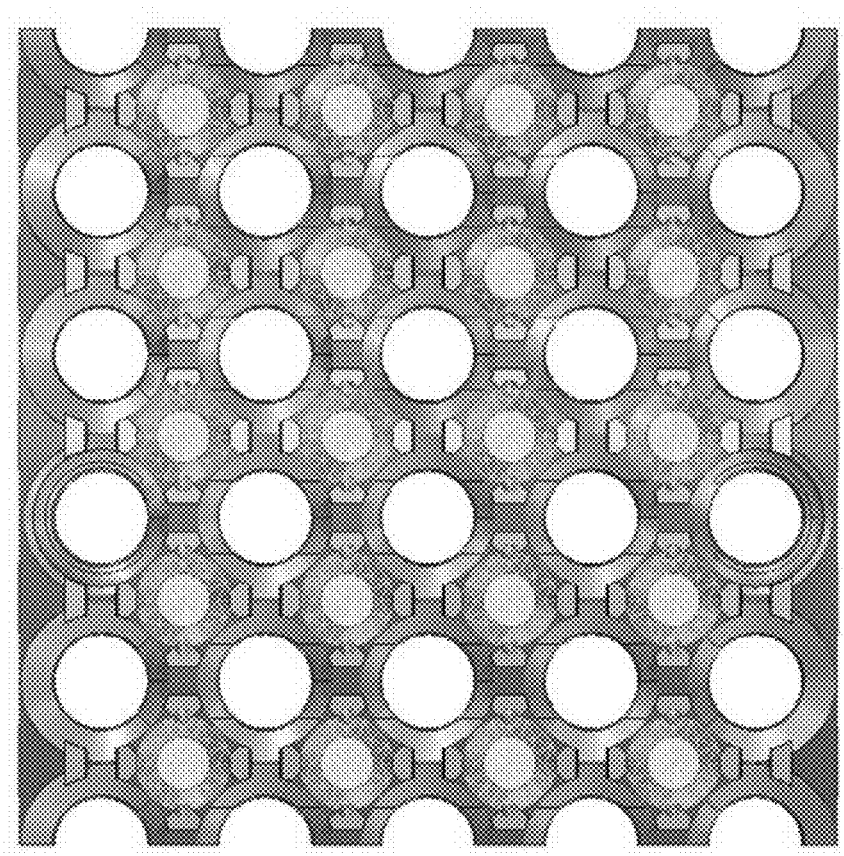
FIG. 7A shows the top view of the surface of the base with the smaller diameter stones fixed.
Figure 7B:
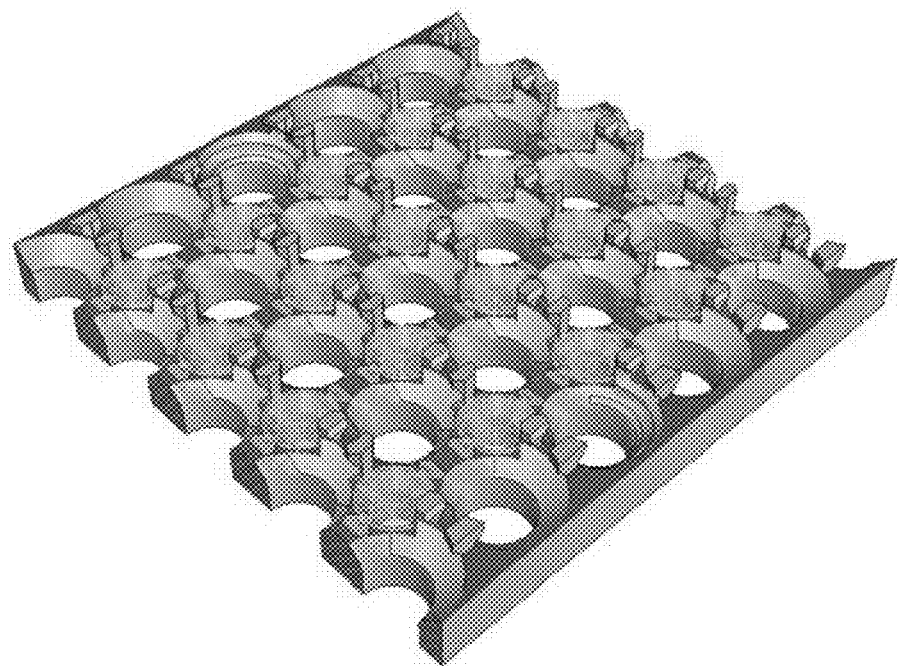
FIG. 7B shows the axonometric view of the surface of the base with the smaller diameter stones fixed.
Figure 8A:
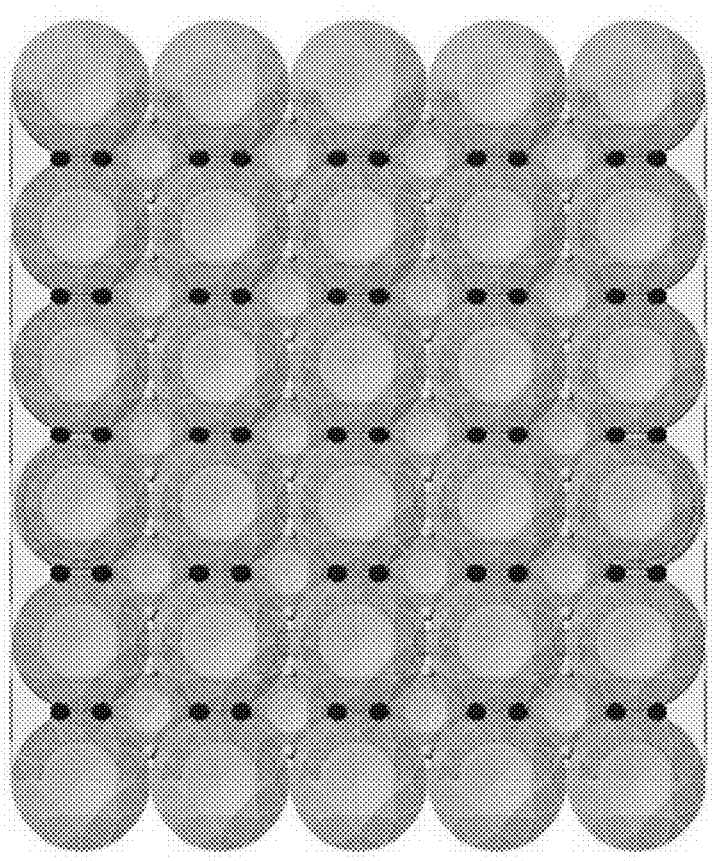
FIG. 8A shows the top view of the surface of the base with the smaller and larger diameter stones fixed.
Figure 8B:
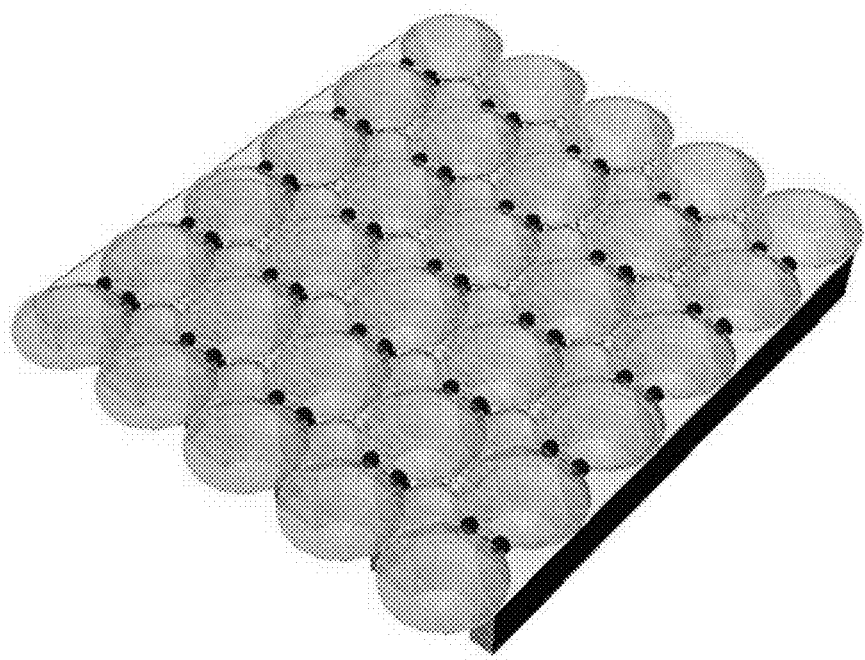
FIG. 8B shows the axonometric view of the surface of the base with the smaller and larger diameter stones fixed.

The smaller diameter stones are placed into the seats in the respective rows one by one and are clenched by the protruding projections or beads. FIG. 7a and FIG. 7b show the surface of the base with the smaller diameter stones placed. Then the larger diameter stones are placed in the respective rows and clenched by the protruding projections or beads, as shown in FIG. 8a and FIG. 8b. At the same time the stones are placed into the seats formed by the straight, or radial, or arcuate rows, where the rows of seats for the larger diameter stones interchange with the rows of seats for the smaller diameter stones, and both the larger and smaller diameter stones form a multilevel stones arrangement structure. And the smaller diameter stones are placed at the lower level, while the larger diameter stones are placed at the top level, so that the girdle of the smaller diameter stones is below the girdle the larger diameter stones as to the surface of the base. This is done to ensure the multilevel allocation of the stones on the base, which increases the percentage of coverage of the base by the stones.

The stones are mounted by processing the protruding projections or beads until the required form is achieved, where the processing involves the simultaneous pressing and rotation of the burin onto the protruding projections or beads.

If the larger diameter stone is located in the last row or in the row adjacent to the last row of the smaller diameter stones, it is mounted by clenching with two processed protruding projections or beads located on the opposite sides of the same groove at least at two points on the edge of the seat. If the larger diameter stone is separated from the edge of the base by at least one row of the large diameter stones, it is mounted by clenching with two pairs of the processed protruding projections or beads located on the opposite sides of the same groove.

If the smaller diameter stone is located in the last row, it is mounted by clenching with a processed protruding projection or a bead from one side at least at one point. If the smaller diameter stone is located between the rows of the larger diameter stones, it is mounted by clenching with two processed protruding projections or beads located at the edges of two adjacent non-overlapping grooves.

As shown in FIG. 7a, FIG. 7b, FIG. 8a, FIG. 8b, the predetermined form of each protruding projection or bead processed by a burin is the spheroidal end. At least one size of the spheroidal end of the protruding projection or bead used for fixing the larger diameter stone, is bigger than the same size of the spheroidal end of the protruding projection or bead used for fixing the smaller diameter stone. This differentiation in sizes of the spheroidal ends of beads ensures more secure mounting of stones of various diameters, without reducing the area of the base covered by the stones. The chosen form of the protruding projection or bead end prevents its adhesion to clothing, skin or other surfaces while wearing a final product.

If the spheroidal end of the protruding projection or bead is damaged, the larger diameter stone will not fall out of the seat, which is achieved due to other beads holding the stone in its seat. If, in case of a mechanical damage of the product, the larger diameter stone falls out, the neighboring stones both of the larger and the smaller diameter, will remain in their seats, because each stone is held it its seat by a couple of protruding projections or beads. The stone that fell out can be quite easily inserted back into its seat and fixed again by the protruding projections or beads. The proposed method of stone mounting significantly improves maintainability of the final products.

The ratio of the area covered by the stones to the total area of the base gives a relative ratio of covering the product surface with the stones. At the same time it should be taken into account that only the side of the product with the stones placed on it is considered as the base area. For example, if this method is used for making a ring, only the outer area of the ring will be the base area, since the inner ring area is adjacent to the wearing site and does not elect the product attractiveness in general.

Figure 9C:
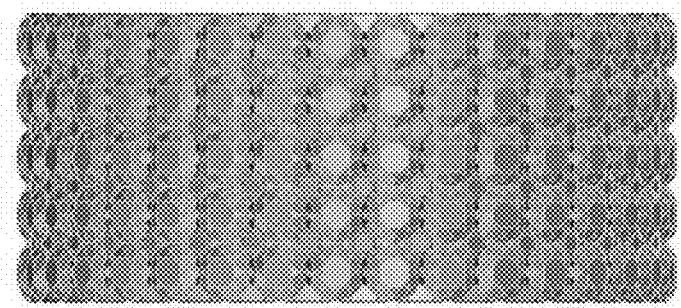
FIG. 9C shows one more view of the final ring design.
Figure 9B:
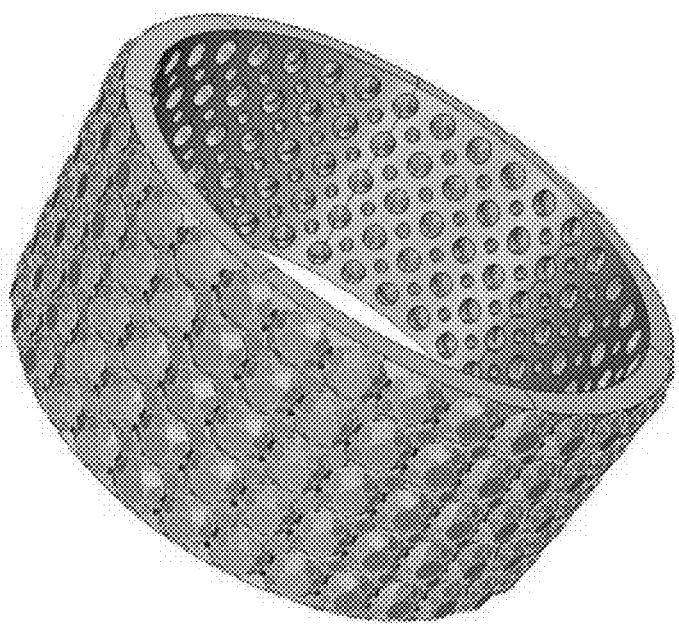
FIG. 9B shows the axonometric view of the final ring design.
Figure 9A:
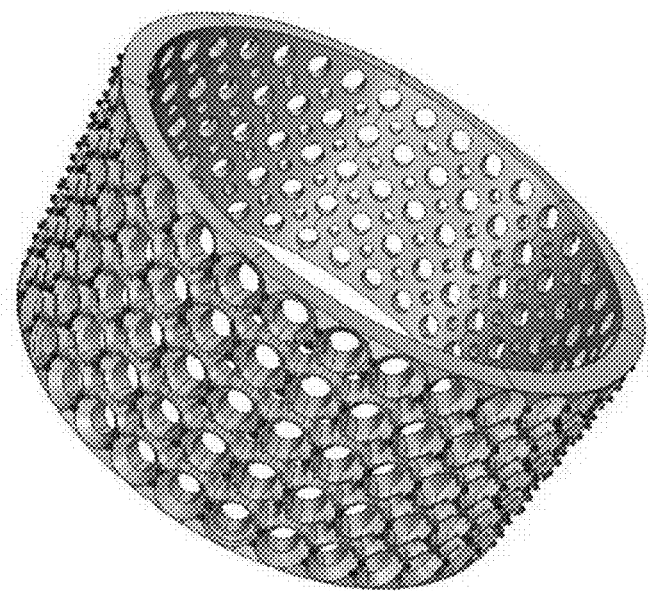
FIG. 9A shows the axonometric view of the base for a ring design.

As shown in FIG. 9a, FIG. 9b, FIG. 9c, the product design ensures that the outer edge of the base with the stones fixed on it is cut off at the girdle level of the stones of the same diameter. In this case some metal parts of a triangular shape uncovered by the stones are formed on the outer edge. By this application approximately 90% of the base is covered.

Figure 10C:
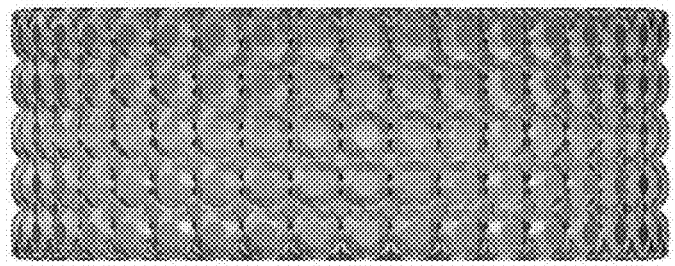
FIG. 10C shows one more view of the alternative final ring design.
Figure 10B:
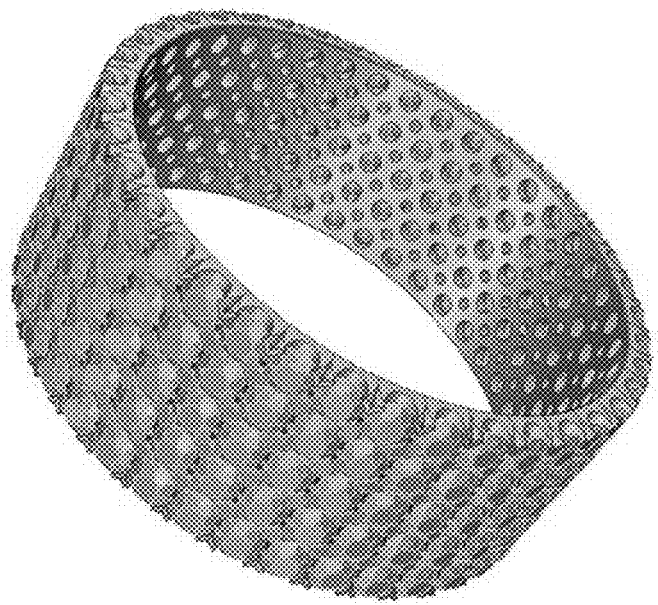
FIG. 10B shows the axonometric view of the alternative final ring design.
Figure 10A:
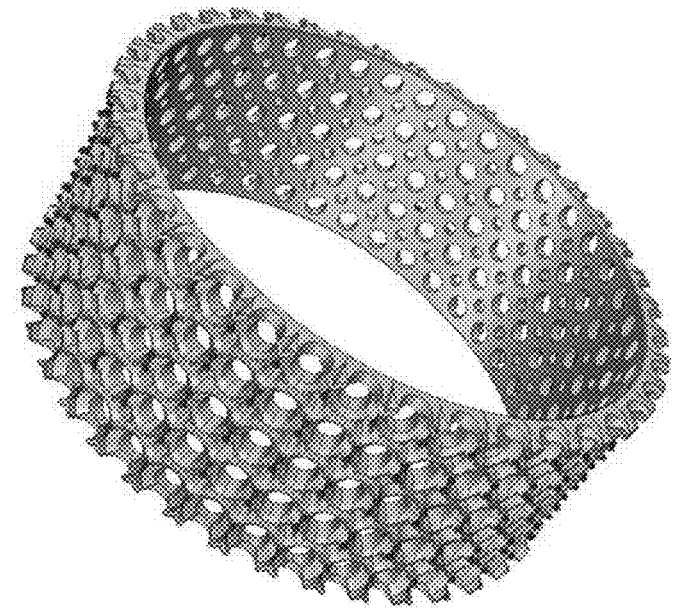
FIG. 10A shows the axonometric view of the base of an alternative ring design.

Another design, as it shown in FIG. 10a, FIG. 10b, FIG. 10c, ensures that the outer edge of the base with the fixed stones on it is cut off around the circumference that repeats the circle of the stones girdles of the same diameter of the outer edge, at a predetermined distance from the stones girdles of the same diameter of the outer edge, with an uncovered metal V-shaped area formed on the edge of the base. FIG. 9a is given for more clear understanding of how the base edge is processed. By this application approximately 92% of the base is covered.

Figure 11C:
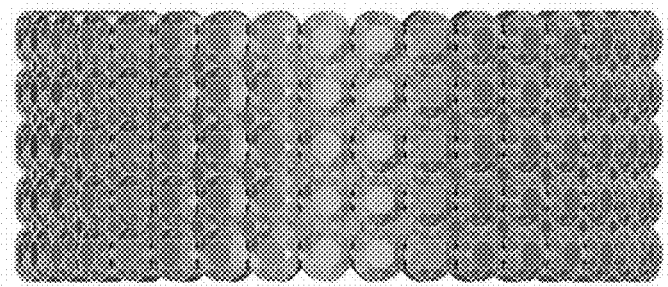
In FIG. 11C shows one more view of the alternative final ring design.
Figure 11B:
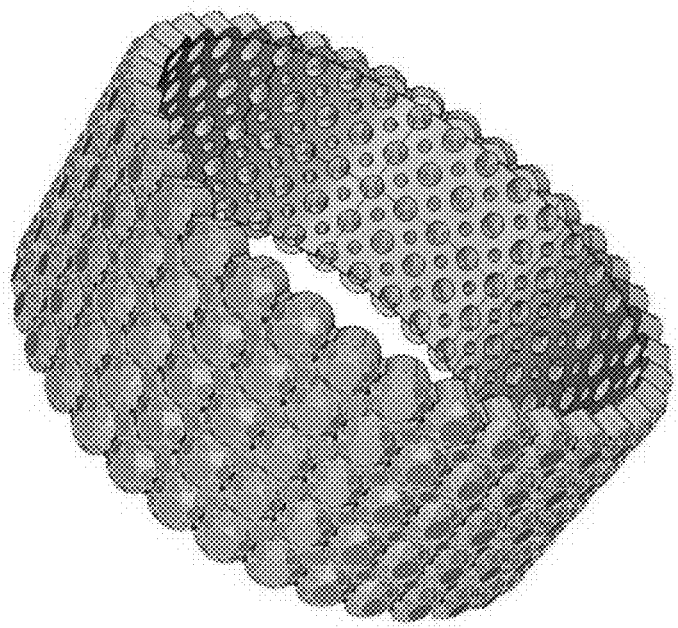
FIG. 11B shows the axonometric view of the alternative final ring design.
Figure 11A:
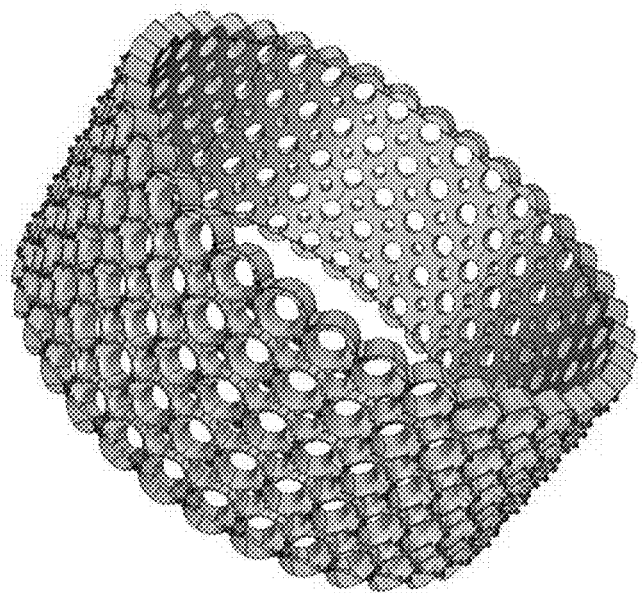
FIG. 11A shows the axonometric view of the base of an alternative ring design.

Another design, as it shown in FIG. 11a, FIG. 11b, FIG. 11c, ensures that the outer edge of the base with the fixed stones on it is cut off around the circumference of the girdles of the same diameter stones of the outer edge. FIG. 10a is given for more clear understanding of how the base edge is processed. By this application approximately 98% of the base is covered.

What is claimed is:

1. A method of setting stones for a piece of a jewelry or a bijouterie made of a metal or a metal alloy, for stones that are used for decoration of the jewelry or the bijouterie and are mounted on a surface of a base in seats, in which a set of stones of a larger diameter and a smaller diameter having a round shape in view from above or round gem-cutting, crown, girdle, and pavilion, are placed on the surface of the jewelry or bijouterie base, the method comprising:

providing the base, its thickness and shape being previously determined based on a type, size, weight of the stones or purpose or a type of the jewelry or bijouterie piece, where the base has at least one outer edge, marking points on the base which correspond to centers of through holes wherein said marked points form a direct, or a radial, or an arcuate row of seats, forming seats for stones of a smaller and a larger diameter, where the smaller and larger diameter seats for stones are made by drilling through holes at said marked points with a smaller diameter drill and then expanding the through holes by a larger diameter drill to make a funnel-shaped seat for each stone, wherein said through holes of seats for smaller diameter stones are smaller in size than said through holes of seats for larger diameter stones, carving grooves on the surface of the base using a burin, wherein the grooves pass across a center of the seats, wherein the grooves are cut lengthwise, crosswise, and diagonally under a preset angle as to each formed row of seats, the preset angle being determined based on a shape or a curvature of the surface of the base; wherein excessive metal is removed by carving out the grooves on the surface of the base, wherein grooves that pass along a row of seats for smaller diameter stones are deeper than grooves that pass along a row of seats for larger diameter stones to ensure a multilevel arrangement of stones of different diameters, forming protruding projections or beads on the surface of the base, wherein said protruding projections or beads are formed on an edge of the seats by expanding funnel-shaped seat entrances with a larger diameter drill both for seats for smaller diameter stones and seats for larger diameter stones, wherein each said protruding projection or bead in cross section forms a rectangle, wherein the protruding projections or beads used for fixing larger diameter stones are larger in size than the protruding projections or beads used for fixing smaller diameter stones, wherein the protruding projections or beads used for fixing larger diameter stones are sharpened by making angular cuts at least on two sides when expanding the funnel-shaped seat entrances with a larger diameter drill, where each said angular cut is intended to cover a girdle of a larger diameter stone, mounting smaller diameter stones one by one in seats of a corresponding row and clamping each smaller diameter stone by corresponding protruding projections or beads, and then mounting larger diameter stones in a corresponding row and clamping each larger diameter stone by corresponding protruding projections or beads, wherein the larger and smaller diameter stones form a multilevel arrangement of stones, wherein the smaller diameter stones are placed at a lower level, while the larger diameter stones are placed at a top level, so that the girdle of a smaller diameter stone is located below the girdle of a larger diameter stone relative to the surface of the base, wherein the larger diameter stones are placed such that the girdles of neighboring larger diameter stones have a point of contact, wherein the larger diameter stones at least partially overlap the smaller diameter stones;

wherein the stones are clamped by a means of processing the protruding projections or beads until a required shape is achieved, where the means of processing comprises a simultaneous pressing and rotation of a ball burr on the protruding projections or beads.

2. The method according to claim 1, wherein an outer edge portion of the base comprising fixed stones ends at the girdle of said fixed stones, and wherein an outer edge portion of the base comprising no fixed stones ends with a metal triangular shape.

3. The method according to claim 1, wherein an outer edge portion of the base comprising fixed stones ends beyond the girdles of said fixed stones, and wherein an outer edge portion of the base comprising no fixed stones ends with a metal V-shaped.

4. The method according to claim 1, wherein an outer edge of the base ends at the girdle of each outermost stone of each row of stones.

5. The method according to claim 1, wherein each larger diameter stone is fixed by two processed protruding projections or beads located on opposite sides of the same groove at least in two points.

6. The method according to claim 1, wherein each larger diameter stone is fixed by two pairs of processed protruding projections or beads located on opposite sides of the same groove.

7. The method according to claim 1, wherein each smaller diameter stone is fixed either by one processed protruding projection or bead from one side at least in one point or by two processed protruding projections or beads placed at edges of two adjacent non-overlapping grooves.

8. The method according to claim 1, wherein a form of each protruding projection or bead processed by the ball burr has a spherical end.

9. The method according to claim 8, wherein at least one size of the spherical end of a protruding projection or bead used for fixing a larger diameter stone is bigger than a size of the spherical end of a protruding projection or bead used for fixing a smaller diameter stone.

\* \* \* \* \*